United States Patent
Bu et al.

(10) Patent No.: US 11,136,490 B2
(45) Date of Patent: Oct. 5, 2021

(54) PH SENSITIVE WATER-ABSORBENT RESIN SUITABLE FOR OIL WELL CEMENT SLURRY AND APPLICATION THEREOF

(71) Applicant: CHINA UNIVERSITY OF PETROLEUM (EAST CHINA), Qingdao (CN)

(72) Inventors: Yuhuan Bu, Qingdao (CN); Chunyu Wang, Qingdao (CN); Huajie Liu, Qingdao (CN); Leiju Tian, Qingdao (CN); Xinyang Guo, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 62 days.

(21) Appl. No.: 16/495,841

(22) PCT Filed: May 25, 2018

(86) PCT No.: PCT/CN2018/088414
§ 371 (c)(1),
(2) Date: Sep. 20, 2019

(87) PCT Pub. No.: WO2019/091092
PCT Pub. Date: May 16, 2019

(65) Prior Publication Data
US 2020/0102486 A1    Apr. 2, 2020

(30) Foreign Application Priority Data
Nov. 10, 2017    (CN) .......................... 201711104881.1

(51) Int. Cl.
*C09K 8/487*    (2006.01)
*C08F 220/34*    (2006.01)
(Continued)

(52) U.S. Cl.
CPC ............ *C09K 8/487* (2013.01); *C08F 220/34* (2013.01); *C08K 3/30* (2013.01); *C08K 5/09* (2013.01);
(Continued)

(58) Field of Classification Search
None
See application file for complete search history.

(56) References Cited

U.S. PATENT DOCUMENTS 3,140,265 A * 7/1964 Richter, Jr. ............... D01F 6/36
                                                            428/97
3,857,824 A * 12/1974 Atkins .................. C08F 220/56
                                                            526/201
(Continued)

FOREIGN PATENT DOCUMENTS

| CN | 100567375 C | 12/2009 |
|---|---|---|
| CN | 101701051 A | 5/2010 |

(Continued)

*Primary Examiner* — Charles R Nold
(74) *Attorney, Agent, or Firm* — Bayramoglu Law Offices LLC

(57) ABSTRACT

A pH sensitive water-absorbent resin suitable for oil well cement slurry and an application thereof are provided. The pH sensitive water-absorbent resin includes distilled water, a monomer, a mixed auxiliary agent, a crosslinking agent and an initiator, the amount of the monomer is 30% to 100% of the mass of the distilled water, the amount of the mixed auxiliary agent is 16% to 67% of the mass of the monomer, the amount of the crosslinking agent is 0.2% to 1% of the mass of the monomer, and the amount of the initiator is 0.4 to 1% of the mass of the monomer.

17 Claims, 2 Drawing Sheets

(51) Int. Cl.
*C08K 3/30* (2006.01)
*C08K 5/20* (2006.01)
*C08K 5/09* (2006.01)

(52) U.S. Cl.
CPC ........ *C08K 5/20* (2013.01); *C08K 2003/3054* (2013.01)

(56) References Cited

U.S. PATENT DOCUMENTS

| | | | |
|---|---|---|---|
| 4,018,286 A | 4/1977 | Gall et al. | |
| 6,225,395 B1* | 5/2001 | Nzudie | C02F 1/56 524/458 |
| 2015/0345079 A1* | 12/2015 | Engstrom | D21H 17/37 162/164.6 |

FOREIGN PATENT DOCUMENTS

| | | |
|---|---|---|
| CN | 102311517 A | 1/2012 |
| CN | 103554328 A | 2/2014 |
| CN | 104558442 A | 4/2015 |
| CN | 105566564 A | 5/2016 |
| CN | 106281267 A | 1/2017 |
| CN | 106800382 A | 6/2017 |
| CN | 107759725 A | 3/2018 |
| WO | 9801421 A1 | 1/1998 |
| WO | 2004064816 A1 | 8/2004 |

\* cited by examiner

PH SENSITIVE WATER-ABSORBENT RESIN SUITABLE FOR OIL WELL CEMENT SLURRY AND APPLICATION THEREOF

CROSS REFERENCE TO THE RELATED APPLICATIONS

This application is the national phase entry of International Application No. PCT/CN2018/088414, filed on May 25, 2018, which is based upon and claims priority to Chinese Patent Application No. 201711104881.1, filed on Nov. 10, 2017, the entire contents of which are incorporated herein by reference.

TECHNICAL FIELD

The present disclosure relates to a pH sensitive water-absorbent resin, in particular to a pH sensitive water-absorbent resin suitable for an oil well cement slurry and an application thereof, and belongs to the fields of oil and gas well cementing and oilfield chemistry.

BACKGROUND

The main purpose of well cementing is to protect the production string and seal oil layer, gas layer and water layer adjacent to one another. After well cement is solidified, a vertical hydraulic sealing system is formed. Therefore, effective interlayer sealing must be achieved throughout the life period of oil and gas well and after abandonment. Set cement is a brittle material. With the exploration and development target becoming more and more complex, set cement, affected by stress and temperature variations, is inevitably susceptible to damage and may form micro-fractures, which results in formation of fluid channeling, oil and gas leakage, casing corrosion and may cause other accidents. These problems have serious impacts on safe exploitation of oil and gas and biophysical environment, and may shorten the life of oil and gas well. Cement squeezing workover is not only costly but also has a low success rate.

Water-absorbent resin is added into oil well cement slurry as an additive. When micro-fractures occur inside hardened set cement, the water-absorbent resin gets exposed to the surface of micro-fractures. When water flows through micro-fractures, the water-absorbent resin absorbs the water and expands to block the micro-fractures, thus realizing self-sealing of micro-fractures in the set cement. Therefore, developing water-absorbent resin suitable for oil well cement slurry is of great significance for preventing formation fluid channeling and ensuring long-term and effective isolation of cement sheath.

A chitosan crosslinked polymaleic anhydride super water-absorbent resin was disclosed in Chinese patent CN201410818719.6. The resin presents pH sensitivity, but chitosan has poor thermal stability at high temperatures and degrade easily, so the resin is not suitable for oil well cement in high temperature environment. The water-absorbent gels disclosed by the international patents WO2004064816A1, WO1998001421A1, Chinese patents CN201510792937.1, CN200710042753.9, etc., absorb more water in an alkaline environment than in a neutral environment. The pH sensitive hydrogel disclosed by Chinese patent CN201310485548.5 shows that the pH value affects the adsorption of heavy metal ions by hydrogel, but does not indicate its pH-sensitive water swelling property. The pH sensitive hydrogel disclosed in Chinese patent CN200910217799.9 has a pH sensitivity where the hydrogel absorbs more water in a neutral environment than in an acidic environment, but does not indicate its water swelling property under alkaline conditions. The super water-absorbent resin with pH sensitivity disclosed by Chinese patent CN102311517 controls the reversible breaking or bonding of sensitive groups by adjusting the pH value to control the degradation/recovery of water-absorbent resin, which should be used in a weak alkaline environment, and cannot be applied in the oil well cement to block micro-fractures.

SUMMARY

In order to overcome the above problems of the prior art, the objective of the present disclosure is to provide a pH sensitive water-absorbent resin suitable for oil well cement slurry and an application thereof.

In order to achieve the above-mentioned objective, the technical solution of the present disclosure is as follows.

A pH sensitive water-absorbent resin includes distilled water, a monomer, a mixed auxiliary agent, a crosslinking agent and an initiator, wherein an amount of the monomer is 30% to 100% of a mass of the distilled water, an amount of the mixed auxiliary agent is 16% to 67% of a mass of the monomer, an amount of the crosslinking agent is 0.2% to 1% of the mass of the monomer, and an a amount of the initiator is 0.4 to 1% of the mass of the monomer.

Preferably, the amount of the monomer is 30% to 70% of the mass of the distilled water, the amount of the mixed auxiliary agent is 22.5% to 50% of the mass of the monomer, the amount of the crosslinking agent is 0.6% of the mass of the monomer, and the amount of the initiator is 0.64 to 1% of the mass of the monomer.

Preferably, the amount of the monomer is 42.3% to 59.1% of the mass of the distilled water, the amount of the mixed auxiliary agent is 36.4% to 46.2% of the mass of the monomer, and the amount of the initiator is 0.69 to 0.81% of the mass of the monomer.

Further preferably, the amount of the monomer is 50% of the mass of the distilled water, the amount of the mixed auxiliary agent is 41.67% of the mass of the monomer, the amount of the crosslinking agent is 0.6% of the mass of the monomer, and the amount of the initiator is 0.75% of the mass of the monomer.

Preferably, the monomer is a mixture of dimethylaminoethyl methacrylate and acryloxyethyl trimethylammonium chloride, and a mass ratio of the dimethylaminoethyl methacrylate to the acryloxyethyl trimethylammonium chloride is 10-150:100.

Further preferably, the mass ratio of the dimethylaminoethyl methacrylate to the acryloxyethyl trimethylammonium chloride is 50-134:100.

Preferably, the mixed auxiliary agent is acetic acid.

Preferably, the crosslinking agent is N,N'-methylenebisacrylamide.

Preferably, the initiator is one of ammonium persulfate or potassium persulfate.

A preparation method of the pH sensitive water-absorbent resin is as follows: adding distilled water, a monomer, a mixed auxiliary agent, a crosslinking agent to a reaction vessel sequentially, mixing uniformly, and then adding an initiator, carrying out a reaction in a water bath statically to form a product, soaking the product in a saturated calcium hydroxide solution at 75° C. for 24 hours, then, drying and pulverizing to obtain the pH sensitive water-absorbent resin.

The present disclosure also provides a use of the above-mentioned pH sensitive water-absorbent resin as a water swelling component in oil well cement slurry.

The present disclosure uses the acetic acid as the mixed auxiliary agent, whose function is to promote a mixing of the dimethylaminoethyl methacrylate and acryloyloxyethyl trimethylammonium chloride.

The pH sensitive functional monomers used in the present invention are dimethylaminoethyl methacrylate and acryloyethyl trimethylammonium chloride. Because of the existence of amino group in the dimethylaminoethyl methacrylate and quaternary ammonium salt group in the acryloyethyl trimethylammonium chloride, the charged condition of the copolymer of the two monomers are different in solutions with different pH values, which is one of the key factors affecting the water absorption performance of the water-absorbent resin. In an acidic solution, the amino group is bonded to a hydrogen ion, and the quaternary ammonium salt group is ionized, so that the molecule of the copolymer is positively charged and mutually repelled, the molecular chain is stretched, and the water absorption amount of the water-absorbent resin becomes large. In a neutral solution, the quaternary ammonium salt group is ionized, and the water absorption amount of the resin is also increased due to the positive charge of the molecular chain, but the water absorption amount of the resin is less in the neutral solution than that in the acidic solution due to the small amount of the positive charge; In an alkaline solution, an hydroxide ion may inhibit the ionization of the quaternary ammonium salt group, and the molecular chain of the copolymer is not charged, so the water absorption amount of the resin is greatly reduced.

Advantages of the present disclosure: the pH sensitive water-absorbent resin prepared by the present disclosure is added into the oil well cement slurry, absorbing less amount of water in the alkaline environment of the cement slurry, which greatly reduces the influence of the water-absorbent resin on the rheology of the oil well cement slurry and the compressive strength of the set cement after curing, and ensures the smooth implementation of cementing operations. In addition, the water-absorbent resin absorbs more water in a neutral environment, and most of the formation water is neutral. Therefore, the water-absorbent resin absorbs water passing through micro-fractures and then swells to block the micro-fractures, thereby realizing self-sealing of micro-fractures in oil well set cement.

DETAILED DESCRIPTION OF THE EMBODIMENTS

Figure 1:
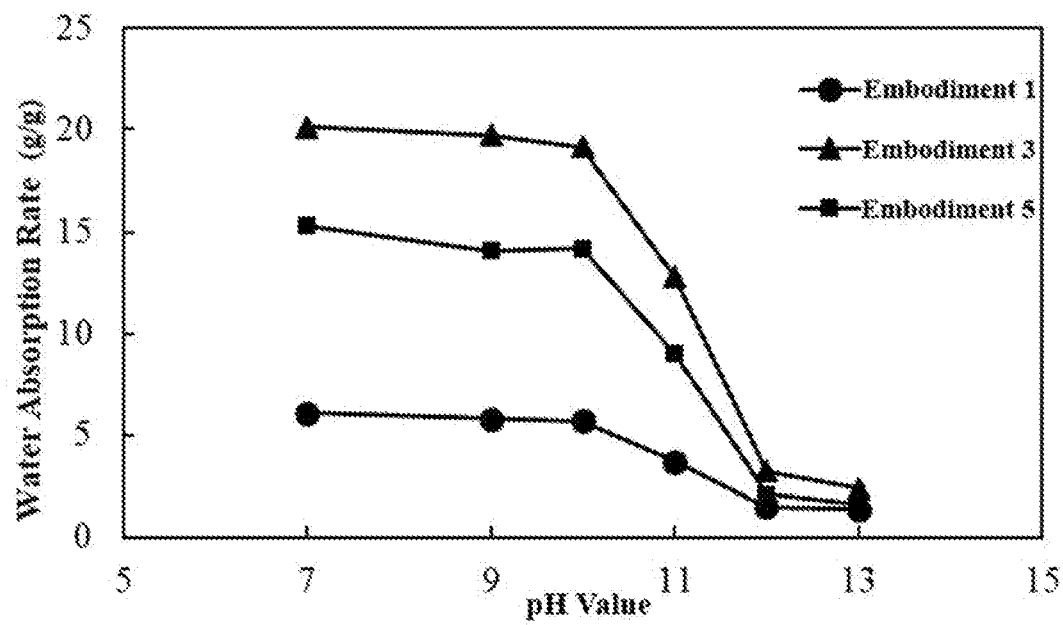
FIG. 1 shows curves of water absorption rates of water-absorbent resins obtained in Embodiment 1, 3 and 5 in distilled water and sodium hydroxide solutions with different pH values.

The present disclosure will be further described below in conjunction with the drawings and the embodiments. It should be noted that the following description is only for the purpose of explaining the present disclosure and is not intended to limit the content thereof.

Embodiment 1

15 g of distilled water, 1.5 g of dimethylaminoethyl methacrylate, 3 g of acryloyloxyethyl trimethylammonium chloride, 1 g of acetic acid, and 0.027 g of N,N'-methylenebisacrylamide were added to a reaction vessel, nitrogen was introduced into the reaction vessel to discharge oxygen outside, after stirring for 10 min, 0.9 g of ammonium persulfate solution with a concentration of 5% was added dropwise, and a reaction was statically carried out in a water bath at 50° C. for 3 hours to form a product. The product was soaked in a saturated calcium hydroxide solution at 75° C. for 24 hours, then dried at 80° C. for 48 hours, and pulverized to obtain a pH sensitive water-absorbent resin.

Embodiment 2

13 g of distilled water, 2.5 g of dimethylaminoethyl methacrylate, 3 g of acryloyloxyethyl trimethylammonium chloride, 2 g of acetic acid, and 0.033 g of N,N'-methylenebisacrylamide were added to a reaction vessel, nitrogen was introduced into the reaction vessel to discharge oxygen outside, after stirring for 10 min, 0.9 g of ammonium persulfate solution with a concentration of 5% was added dropwise, and a reaction was statically carried out in a water bath at 50° C. for 3 hours to form a product. The product was soaked in a saturated calcium hydroxide solution at 75° C. for 24 hours, then dried at 80° C. for 48 hours, and pulverized to obtain a pH sensitive water-absorbent resin.

Embodiment 3

12 g of distilled water, 3 g of dimethylaminoethyl methacrylate, 3 g of acryloyloxyethyl trimethylammonium chloride, 2.5 g of acetic acid, and 0.036 g of N,N'-methylenebisacrylamide were added to a reaction vessel, nitrogen was introduced into the reaction vessel to discharge oxygen outside, after stirring for 10 min, 0.9 g of ammonium persulfate solution with a concentration of 5% was added dropwise, and a reaction was statically carried out in a water bath at 50° C. for 3 hours to form a product. The product was soaked in a saturated calcium hydroxide solution at 75° C. for 24 hours, then dried at 80° C. for 48 hours, and pulverized to obtain a pH sensitive water-absorbent resin.

Embodiment 4

11 g of distilled water, 3.5 g of dimethylaminoethyl methacrylate, 3 g of acryloyloxyethyl trimethylammonium chloride, 3 g of acetic acid, and 0.039 g of N,N'-methylenebisacrylamide were added to a reaction vessel, nitrogen was introduced into the reaction vessel to discharge oxygen outside, after stirring for 10 min, 0.9 g of ammonium persulfate solution with a concentration of 5% was added dropwise, and a reaction was statically carried out in a water bath at 50° C. for 3 hours to form a product. The product was soaked in a saturated calcium hydroxide solution at 75° C. for 24 hours, then dried at 80° C. for 48 hours, and pulverized to obtain a pH sensitive water-absorbent resin.

Embodiment 5

10 g of distilled water, 4 g of dimethylaminoethyl methacrylate, 3 g of acryloyloxyethyl trimethylammonium chloride, 3.5 g of acetic acid, and 0.042 g of N,N'-methylenebisacrylamide were added to a reaction vessel, nitrogen was introduced into the reaction vessel to discharge oxygen outside, after stirring for 10 min, 0.9 g of ammonium persulfate solution with a concentration of 5% was added dropwise, and a reaction was statically carried out in a water bath at 50° C. for 3 hours to form a product. The product was soaked in a saturated calcium hydroxide solution at 75° C. for 24 hours, then dried at 80° C. for 48 hours, and pulverized to obtain a pH sensitive water-absorbent resin.

Embodiment 6

12 g of distilled water, 3 g of dimethylaminoethyl methacrylate, 3 g of acryloyloxyethyl trimethylammonium chloride, 2.5 g of acetic acid, and 0.012 g of N,N'-methylenebisacrylamide were added to a reaction vessel, nitrogen was introduced into the reaction vessel to discharge oxygen outside, after stirring for 10 min, 0.9 g of ammonium persulfate solution with a concentration of 5% was added dropwise, and a reaction was statically carried out in a water bath at 50° C. for 3 hours to form a product. The product was soaked in a saturated calcium hydroxide solution at 75° C. for 24 hours, then dried at 80° C. for 48 hours, and pulverized to obtain a pH sensitive water-absorbent resin.

Embodiment 7

12 g of distilled water, 3 g of dimethylaminoethyl methacrylate, 3 g of acryloyloxyethyl trimethylammonium chloride, 2.5 g of acetic acid, and 0.024 g of N,N'-methylenebisacrylamide were added to a reaction vessel, nitrogen was introduced into the reaction vessel to discharge oxygen outside, after stirring for 10 min, 0.9 g of ammonium persulfate solution with a concentration of 5% was added dropwise, and a reaction was statically carried out in a water bath at 50° C. for 3 hours to form a product. The product was soaked in a saturated calcium hydroxide solution at 75° C. for 24 hours, then dried at 80° C. for 48 hours, and pulverized to obtain a pH sensitive water-absorbent resin.

Embodiment 8

12 g of distilled water, 3 g of dimethylaminoethyl methacrylate, 3 g of acryloyloxyethyl trimethylammonium chloride, 2.5 g of acetic acid, and 0.048 g of N,N'-methylenebisacrylamide were added to a reaction vessel, nitrogen was introduced into the reaction vessel to discharge oxygen outside, after stirring for 10 min, 0.9 g of ammonium persulfate solution with a concentration of 5% was added dropwise, and a reaction was statically carried out in a water bath at 50° C. for 3 hours to form a product. The product was soaked in a saturated calcium hydroxide solution at 75° C. for 24 hours, then dried at 80° C. for 48 hours, and pulverized to obtain a pH sensitive water-absorbent resin.

Test Example

A method for determining the liquid absorption rate of pH sensitive water-absorbent resin is as follows:

A certain mass of the pH sensitive water-absorbent resin powder was weighed as W1 and put into a white non-woven bag. The total mass of the resin and the bag was weighed and recorded as W2. Then, the bag containing the resin was put into distilled water or cement slurry filtrate or sodium hydroxide solution with different pH values. Considering the downhole temperature, the water absorption test was carried out at 75° C. The non-woven bag was taken out every 5 minutes and suspended until substantially no drop fell down. The total mass of the non-woven bag and the resin absorbing the liquid was weighed and recorded as W3. The liquid absorption rate of the pH sensitive water-absorbent resin was calculated using the formula:

Water Absorption Rate (g/g)=(W3−W2)/W1.

1. The water-absorbent resins obtained in Embodiments 1, 3 and 5 were respectively put in distilled water and sodium hydroxide solution with pH values of 9, 10, 11, 12 and 13. Water absorption rates were determined by the above-mentioned method, and the results were shown in FIG. 1. As can be seen from the figure, the above-mentioned water-absorbent resin has a high water absorption rate in distilled water and an alkaline solution having a pH of less than 10, and when the pH is larger than 10, the water absorption rate is remarkably low, and when the pH is greater than 12, the water absorption rate is extremely low.

Specifically, the water-absorbent resin obtained in Embodiment 3 has the highest water absorption rate in a neutral liquid and an alkaline solution having a pH of less than 10. With the increase of the pH of the solution, the water absorption rate varies most obviously.

Figure 2:
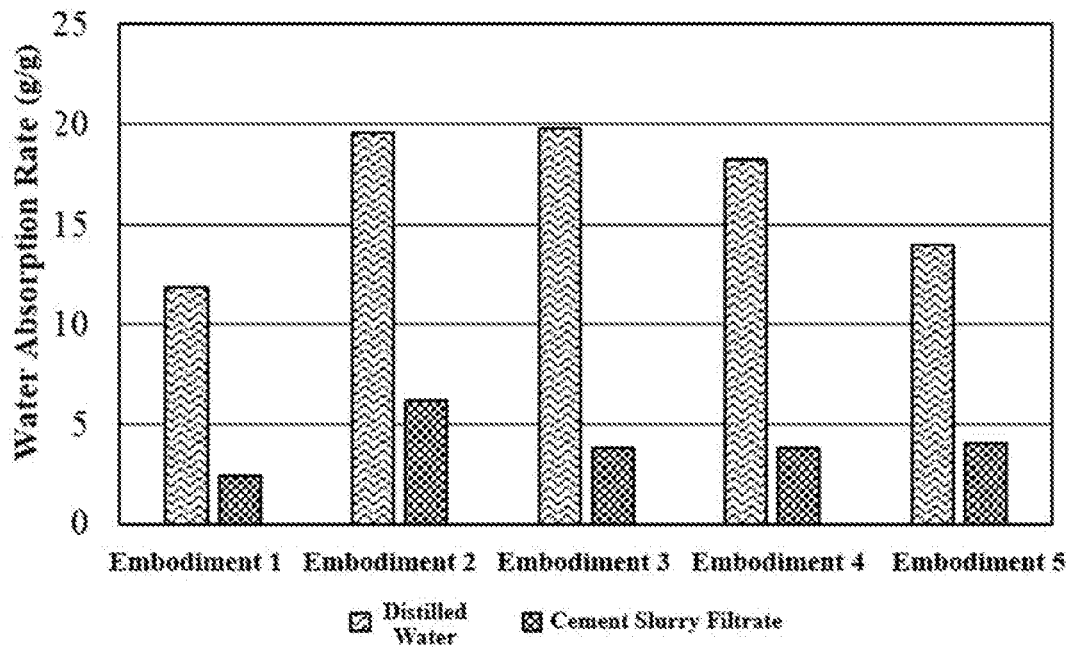
FIG. 2 shows a comparative diagram showing water absorption rates of water-absorbent resins obtained by different ratios of monomer in distilled water and cement slurry filtrate.
Figure 3:
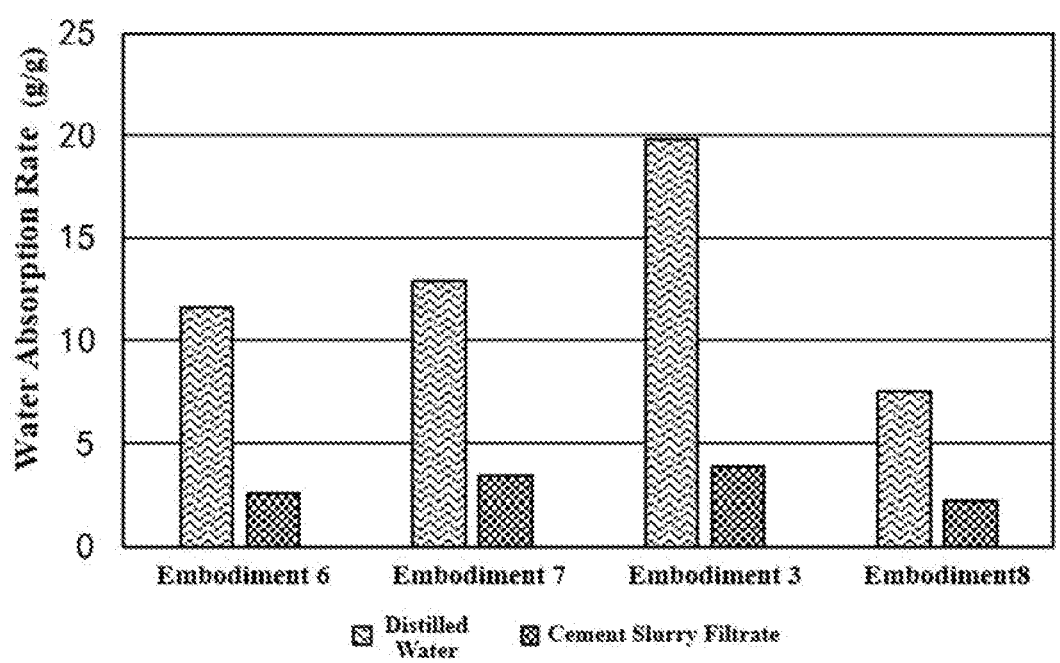
FIG. 3 shows a comparative diagram showing water absorption rates of water-absorbent resins obtained by different adding amounts of crosslinking agent in distilled water and cement slurry filtrate.

2. The water-absorbent resins obtained in Embodiments 1-8 were respectively put in distilled water and cement slurry filtrate. Water absorption rates were determined by the above-mentioned method, and the results were shown in FIG. 2 and FIG. 3. It can be seen from the figures that the above-mentioned water-absorbent resins respectively has a relatively high water absorption rate in distilled water and has a very low water absorption rat in the cement slurry filtrate, which indicates that the pH sensitive water-absorbent resin prepared by the method of the present disclosure is suitable for use in oil well cement slurry.

Specifically, the water-absorbent resin obtained in Embodiment 3 has the largest water absorption rate in distilled water, having a significance difference compared with that in the cement slurry.

The specific embodiments of the present disclosure have been described above in conjunction with the drawings. However, it is not intended to limit the protective scope of the present invention. On the basis of the technical solutions of the present invention, various modifications or modifications that can be made by those skilled in the art without any creative effort are still within the protective scope of the present invention.

What is claimed is:

1. A pH sensitive water-absorbent resin, comprising: distilled water, a monomer, a mixed auxiliary agent, a crosslinking agent and an initiator, wherein an amount of the monomer is 30% to 100% of a mass of the distilled water, an amount of the mixed auxiliary agent is 16% to 67% of a mass of the monomer, an amount of the crosslinking agent is 0.2% to 1% of the mass of the monomer, and an amount of the initiator is 0.4 to 1% of the mass of the monomer;
  wherein the monomer is a mixture of dimethylaminoethyl methacrylate and acryloxyethyl trimethylammonium chloride, and a mass ratio of the dimethylaminoethyl methacrylate to the acryloxyethyl trimethylammonium chloride is (10-150):100.

2. The pH sensitive water-absorbent resin of claim 1, wherein the amount of the monomer is 30% to 70% of the mass of the distilled water, the amount of the mixed auxiliary agent is 22.5% to 50% of the mass of the monomer, the amount of the crosslinking agent is 0.6% of the mass of the monomer, and the amount of the initiator is 0.64 to 1% of the mass of the monomer.

3. The pH sensitive water-absorbent resin of claim 2, wherein the mixed auxiliary agent is acetic acid.

4. The pH sensitive water-absorbent resin of claim 2, wherein the crosslinking agent is N,N'-methylenebisacrylamide.

5. The pH sensitive water-absorbent resin of claim 2, wherein the initiator is one of ammonium persulfate or potassium persulfate.

6. The pH sensitive water-absorbent resin of claim 1, wherein the amount of the monomer is 42.3% to 59.1% of the mass of the distilled water, the amount of the mixed auxiliary agent is 36.4% to 46.2% of the mass of the monomer, and the amount of the initiator is 0.69 to 0.81% of the mass of the monomer.

7. The pH sensitive water-absorbent resin of claim 6, wherein the mixed auxiliary agent is acetic acid.

8. The pH sensitive water-absorbent resin of claim 6, wherein the crosslinking agent is N,N'-methylenebisacrylamide.

9. The pH sensitive water-absorbent resin of claim 6, wherein the initiator is one of ammonium persulfate or potassium persulfate.

10. The pH sensitive water-absorbent resin of claim 1, wherein the mass ratio of the dimethylaminoethyl methacrylate to the acryloxyethyl trimethylammonium chloride is 50-134:100.

11. The pH sensitive water-absorbent resin of claim 10, wherein the mixed auxiliary agent is acetic acid.

12. The pH sensitive water-absorbent resin of claim 10, wherein the crosslinking agent is N,N'-methylenebisacrylamide.

13. The pH sensitive water-absorbent resin of claim 1, wherein the mixed auxiliary agent is acetic acid.

14. The pH sensitive water-absorbent resin of claim 1, wherein the crosslinking agent is N,N'-methylenebisacrylamide.

15. The pH sensitive water-absorbent resin of claim 1, wherein the initiator is one of ammonium persulfate or potassium persulfate.

16. A method of preparing the pH sensitive water-absorbent resin of claim 1, comprising adding the distilled water, the monomer, the mixed auxiliary agent, the crosslinking agent to a reaction vessel sequentially to obtain a reaction solution, mixing the reaction solution uniformly, then adding the initiator to the reaction solution, carrying out a reaction in a water bath statically to form a product, soaking the product in a saturated calcium hydroxide solution at 75° C. for 24 hours, and then, drying and pulverizing the product to obtain the pH sensitive water-absorbent resin.

17. A method of preparing a water swelling component in an oil well cement slurry, comprising using the pH sensitive water-absorbent resin of claim 1.

* * * * *